(12) United States Patent
Leidig et al.

(10) Patent No.: US 7,594,191 B2
(45) Date of Patent: Sep. 22, 2009

(54) VISUALLY PRESENTING INFORMATION TO A COMPUTER USER

(75) Inventors: Torsten Leidig, Karlsruhe (DE); Ursula Markus, Munich (DE); Daniel Baer, Wuerzburg (DE); Rainer Zinow, Neustadt (DE)

(73) Assignee: SAP AG, Walldorf (DE)

( * ) Notice: Subject to any disclaimer, the term of this patent is extended or adjusted under 35 U.S.C. 154(b) by 569 days.

(21) Appl. No.: 11/392,442

(22) Filed: Mar. 29, 2006

(65) Prior Publication Data

US 2007/0234234 A1 Oct. 4, 2007

(51) Int. Cl.
*G06F 3/048* (2006.01)
(52) U.S. Cl. .................. 715/825; 715/764; 715/834; 715/738
(58) Field of Classification Search .................. 715/764, 715/825, 834, 738
See application file for complete search history.

(56) References Cited

U.S. PATENT DOCUMENTS

| | | | |
|---|---|---|---|
| 6,285,367 B1 * | 9/2001 | Abrams et al. ............... | 715/854 |
| 2003/0197736 A1 * | 10/2003 | Murphy ....................... | 345/780 |

OTHER PUBLICATIONS

Implementation Guide (IMG) [online]. SAP Library, [retrieved on Feb. 27, 2006]. Retrieved from the Internet: <URL:http://help.sap.com/saphelp_nw04/helpdata/en/73/c81c2c52c511d182c50000e829fbfe/content.htm>.

Jankun-Kelly and Ma, "MoireGraphs: Radial Focus+Context Visualization and Interaction for Graphs with Visual Nodes", *IEEE Symposium on Information Visualization 2003*, pp. 1-8.
Sarkar and Brown, "Graphical Fisheye Views of Graphs", *Proceedings of the ACM SIGCHI '92 Conference on Human Factors in Computing Systems*, May 1992, (31 pages).
Alexander Nussbaumer, "Intergrating Four Graph-Based Hierarchy Browsers Into the Hierarchical Visualisation System (HVS)", *IICM, Graz University of Technology*, Aug. 23, 2005, (116 pages).
Herman et al., "Graph Visualization and Navigation in Information Visualization: A Survey", *IEEE Transactions on Visualization and Computer Graphics*, Vo. 6, No. X, XXX, 2000, pp. 1-21.
"Animated Exploration of Graphs with Radial Layout" [online]. University of California, Berkeley (not dated). Retrieved from the Internet: <URL: www.cs.berkeley.edu/~pingster/viz/ieee.pdf>.

* cited by examiner

*Primary Examiner*—Ba Huynh
*Assistant Examiner*—Kim-Lynn Dam
(74) *Attorney, Agent, or Firm*—Fish & Richardson P.C.

(57) ABSTRACT

Information is visually presented to a computer user by receiving, in a computer system, a request to present a first visual item representing a first information portion selected from an information collection available in the computer system. It is determined, in response to the request: (i) which of several predefined categories the first information portion is associated with, and (ii) which of several predefined generality levels the first information portion has. A presentation that includes an area divided into segments extending between a center and a periphery of the area is generated on a display device. The segments correspond to the respective predefined categories and the area is concentrically divided into levels corresponding to the respective predefined generality levels. The first visual item is placed in one of the segments and at one of the levels according to its determined category and generality level. Item distribution effectively uses available space.

18 Claims, 8 Drawing Sheets

VISUALLY PRESENTING INFORMATION TO A COMPUTER USER

TECHNICAL FIELD

The description relates to visually presenting information to a computer user.

BACKGROUND

Search and navigation in collections of complex related information can be a cumbersome process, especially in the context of business applications. There, information is often dispersed over several systems and is available in different representations and formats. Also, the relations and interdependencies of the information portion in a certain context is often either not explicitly described or not easy to find because the user has to switch between multiple systems and tools to examine different pieces of semantically connected information. Metadata information may be available in the business systems but it is typically not used for navigation and browsing across system boundaries. Interrelated representations of information are usually best visualized by graphical rendering which can also be used for interactive browsing.

There exists prior approaches for rendering relational graphs for navigation. In some of these approaches the layout is done in a restricted screen area and does not require the user to scroll to invisible parts. For example, Hyperbolic tree is a technique to map arbitrary large graphs to a hyperbolic surface, which may be a sphere applying non-Euclidian geometric transformations. Nodes and arcs in the center of the viewport are therefore larger than at the border. This means that some nodes and arcs may be in the focus of attention and others may be placed at the border of the viewpoint. This approach generally indicates to the user the relevant nodes. To see them, the user changes the focus to another area which then will be placed in the center. Due to the typical distortion effect, hyperbolic trees are also called fisheye views. Also, a tree layout algorithm is applied before the mapping is done.

Radial tree layout is another technique for rendering graphs. In this algorithm there is one node to be placed in the center of the view. All nodes that are directly linked to this node are placed concentrically on a ring around the center node. Nodes that are linked to the nodes on the first ring are placed on a second ring near the source node. This step can be recursively repeated until all nodes of the tree have been placed. The number of rings can be determined based on the available screen space. In contrast to hyperbolic trees, this means that nodes on any omitted outer rings are not displayed. The user can navigate the graph by changing the focus (clicking on a different node). In this case the selected node is placed in the center and the layout algorithm starts over. The algorithm also can be extended to show other graphs than trees (e.g. directed graphs). However, in this case there may be different possibilities to place nodes that are linked multiple times.

Spring embedder layout algorithms (also called force-directed layout or simulated annealing) have also been used to display fragments of larger graphs. The idea is to simulate the process of an annealing of liquids. Initially, the nodes receive an impulse that make them move continuously. Forces defined between the nodes constrain their movement. Linked nodes have attraction forces attached. Additionally, a smaller distraction force are added to all unlinked nodes. To prevent that the graph moves outside of the viewport a gravity force can also be used, and the viewport vector can be adjusted to the center of the graph. Temperature (impulse) is reduced to zero over time so that the graph becomes static after a while. During the start phase nodes usually find their optimal place in respect to the forces. In most cases the resulting graph layout is free of edge crossings (although there is no guarantee) and the nodes are well distributed.

SUMMARY

The invention relates to visually presenting information to a computer user.

In a first general aspect, a method of visually presenting information to a computer user includes receiving, in a computer system, a request to present a first visual item representing a first information portion selected from an information collection available in the computer system. The method includes determining, in response to the request: (i) which of several predefined categories the first information portion is associated with, and (ii) which of several predefined generality levels the first information portion has. The method includes generating, on a display device, a presentation that includes an area divided into segments extending between a center and a periphery of the area. The segments correspond to the respective predefined categories and the area is concentrically divided into levels corresponding to the respective predefined generality levels. The first visual item is placed in one of the segments and at one of the levels according to its determined category and generality level.

Implementations may include any or all of the following features. When the first information portion is associated with a second information portion in the information collection, the method may further include:

determining, in response to the request: (iii) which of the several predefined categories the second information portion is associated with, and (iv) which of the several predefined generality levels the second information portion has; and placing a second visual item corresponding to the second information portion in one of the segments and at one of the levels according to its determined category and generality level, wherein the first visual item has a focus and the second visual item does not have the focus.

The method may further include:

receiving a user input to change the focus from the first visual item to the second visual item;

determining, in response to the user input, (a) at least a third information portion in the information collection that is associated with the second information portion, (b) which of the several predefined categories the third information portion is associated with, and (c) which of the several predefined generality levels the third information portion has; and placing a third visual item corresponding to the third information portion in one of the segments and at one of the levels according to its determined category and generality level, wherein the second visual item has the focus and the third visual item does not have the focus.

The first information portion may be associated with several information portions in the information collection. The second information portion may be selected from the several information portions based on a closeness criterion. The second information portion may be selected from the several information portions based on a type criterion. When the first visual item is currently located in a first one of the segments, the method may further include resizing the first segment and correspondingly resizing a remainder of the segments to maintain a size of the area. The resizing of the first segment may occur upon a user moving a boundary of the first segment under guidance of the presentation. When the first visual item includes a folder for at least one other visual item, the resizing of the first segment may occur upon a user unfolding the first visual item to show also the at least one other visual item, or upon the user folding the first visual item to cease showing the at least one other visual item. When the first visual item has a focus and a second visual item in the area does not have the focus, the resizing of the first segment may occur upon receiving a user input to change the focus from the first visual item to the second visual item. The method may further include determining, upon the resizing: (a) for any of the segments that become smaller, whether to diminish any visual items located there; and (b) for any of the segments that become larger, whether to enlarge any visual items located there. The method may further include selecting information to be presented together with the first visual item in the presentation, the selection being made based on space available for the first visual item in the area. The method may further include placing the selected information in the area so as to minimize overlap. The method may further include presenting the selected information such that the selected information is partially transparent. The method may further include relocating the first visual item in the area upon a user moving the first visual item under guidance of the presentation. The method may further include presenting an additional area on the display device displaying additional information for the first visual item, and making a change in the area or to the first visual item upon a user selecting an input control in the additional area.

In a second general aspect, a graphical user interface for visually presenting information to a user includes an area divided into segments extending between a center and a periphery of the area. The segments correspond to respective predefined categories. The area is concentrically divided into levels corresponding to respective predefined generality levels. The graphical user interface is configured to place a first visual item corresponding to a first information portion in one of the segments according to one of the predefined categories associated with the first information portion, and at one of the levels according to one of the predefined generality levels that the first information portion has.

Implementations may include any or all of the following features. The graphical user interface may be configured for: (i) automatically resizing the segments while maintaining a size of the area, (ii) presenting a second visual item in the area while a focus is on the first visual item, wherein a user can change the focus from the first visual item to the second visual item, and (iii) automatically adjusting an amount of detail presented in each of the segments based on available space. The graphical user interface may further include an additional area displaying additional information for the first visual item, wherein the graphical user interface is configured for making a change in the area or to the first visual item upon a user selecting an input control in the additional area. The area may have a shape selected from the group consisting of an ellipse, a circle, a square, a triangle, a rectangle, and combinations thereof.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
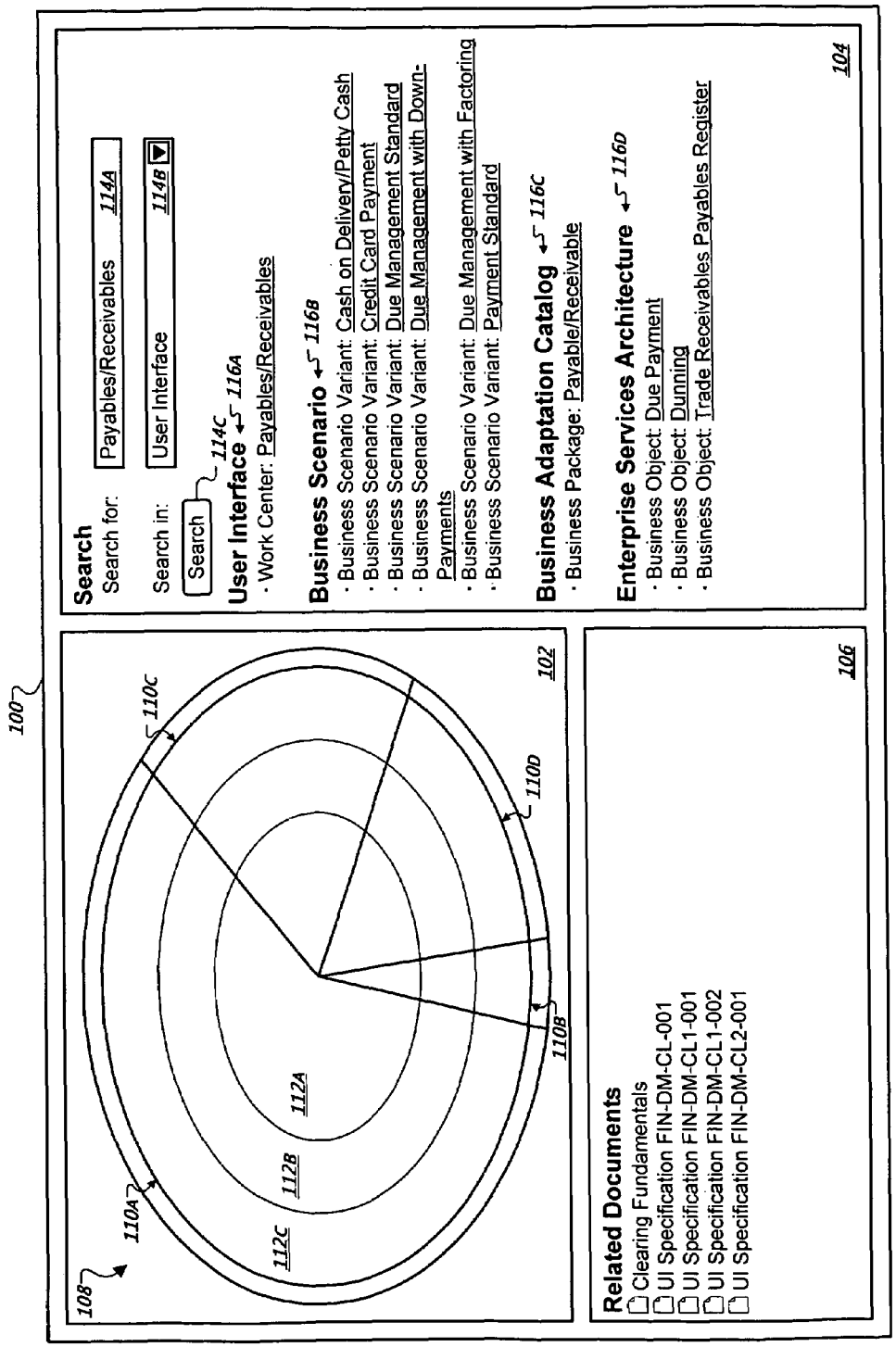
FIG. 1 is an example of a graphical user interface for visually presenting information to a computer user.

FIG. 1 shows an example of a graphical user interface (GUI) 100 for visually presenting information to a computer user. The GUI 100 includes a presentation area 102, a search area 104, and a related documents area 106. Particularly, the GUI 100 presents visual items representing information portions such as database structures, user interface elements, or business processes. The GUI 100 indicates categories associated with the information portions and also generality levels (e.g., hierarchical levels) associated with the information portions. In addition, the GUI 100 may present associations between an information portion and other information portions.

The presentation area 102 presents the information portions as visual items. For example, the presentation area 102 may present the name of an information portion as a visual item, or a symbol representing an information portion as a visual item, or both. The visual item may be a link to additional content regarding the information portion. In addition, the presentation area 102 presents the category and the generality level of each presented information portion. The presentation area 102 may also present associations between the information portions. The presentation area 102 includes an area 108 that can include any or all of the information portions.

The area 108 is here divided into four segments 110A-D. Each of the segments 110A-D extends between a center of the visual representation 108 and a periphery of the visual representation 108. Each of the segments 110A-D corresponds to a category of the information portions. Here, each of the segments 110A-D corresponds to one of a User Interface category, a Business Scenario category, a Business Adaptation Catalog category, and an Enterprise Services Architecture category.

The visual representation 108 is also divided into concentric levels 112A-C. Each of the levels 112A-C corresponds to a generality level of the respective information portions. For example, a generality level may represent an information portion's hierarchical relationship to other information portions. In some implementations, information portions that are more fundamental than other information portions are placed in a concentric level that is closer to the center of the visual representation 108, while information portions that are more specialized than other information portions are placed in a concentric level that is further from the center of the visual representation 108.

The search area 104 allows a user to make one or more search inputs to find a particular information portion and presents results of the search in the area 104 and in the presentation area 102. The search area 104 includes search controls 114A-C. The search control 114A allows a user to make an input that includes a search term, such as "Payables/Receivables." The search control 114B allows a user to make an input that includes a search category, such as "User Interface." A user may initiate a search as defined in the controls 114A and B by selecting the search control 114C. The search area 104 presents a list of the search results. The list includes an information portion having a name that matches the search term in the search control 114A as well as other information portions associated with the matched portion. The search area 104 organizes the listed portions according to the category to which they belong, such as a User Interface category 116A, a Business Scenario category 116B, a Business Adaptation Catalog category 116C, and an Enterprise Service Architecture category 116D.

The area 104 also may display additional information for the visual items, for example as shown here. There may be interaction between the area 104 and the area 102. For example, upon a user selecting an input control (such as a hyperlink) in the area 104, a change can be made in the area or to the relevant visual item. For example, the additional information about an item may include a mention of another item associated therewith. If the user clicks on the other item in the area 104, the area 108 can be updated to instead focus on this item.

The segments 110A-D correspond to the categories 116A-D, respectively. For simplicity in this drawing, no visual items resulting from the search are currently shown in the area 108, but in an actual implementation such item(s) may appear in the area 108 in response to the search. Here, some examples of such visual items will be illustrated in the following drawings.

Figure 2:
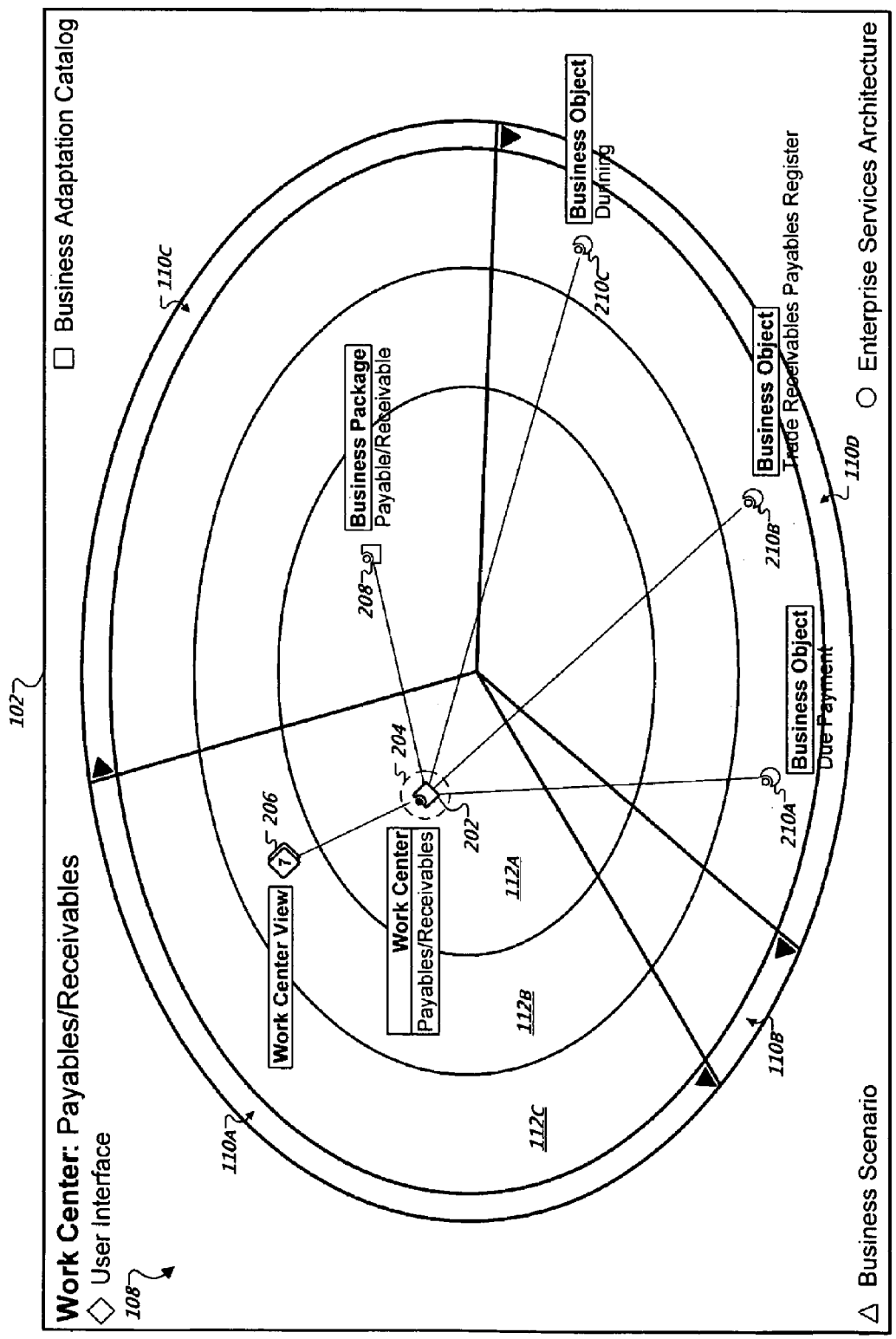
FIG. 2 is an example of a presentation area having a visual item that is in focus.

FIG. 2 is an example of the presentation area 102 including the area 108 and a Payables/Receivables item 202 that is in focus, as indicated by a dashed line 204. With brief reference again to FIG. 1, a user may select a portion, such as the Payables/Receivables portion, in the area 104 to change the focus of the presentation of the selected information portion and its associated information portions in the presentation area 102. The selected portion is represented by a visual item in the presentation area 102. The visual item is then in focus in the presentation area 102, meaning that it forms a starting point for other associated visual items that are displayed in the presentation area 102. The item in focus need not be located at the center of the visual representation 108, but rather is placed in one of the segments 110A-D and at one of the levels 112A-C depending on its properties. In some implementations, the associated items that are displayed may be those that are directly related to the item in focus or those that are indirectly related, such as through one or more other associations between other information portions. In addition, the related documents area 106 shows documents that are related to the item that is currently in focus in the presentation area 102.

With reference now again to FIG. 2, the item 202 is located at the first level 112A corresponding to information portions in the User Interface segment 110A that are of a Work Center generality level. The Payables/Receivables information portion is a member of the User Interface category 116A. The Payables/Receivables item 202 here has associations with other visual items 206, 208, 210A-C as indicated by lines connecting the Payables/Receivables item 202 to the other items 206, 208, 210A-C. These associations may be considered "edges" between the items and correspond to associations between the Payables/Receivables information portion and other information portions represented by the other visual items 206, 208, 210A-C. The associations may represent relationships between the respective information portions such as "used-by," "implemented by," or "belongs-to." The Payables/Receivables item 202 may be labeled with text, such as its name, "Payables/Receivables," and its type "Work Center." In addition, the item 202 may be labeled with other visual cues, such as a symbol (e.g., a diamond shape, a square shape, a circle shape, or a triangle shape), a color, or a shading pattern. Here, the diamond shape indicates that the Payables/Receivables item 202 corresponds to an information portion belonging to the User Interface category 116A and its bold lines indicate that the item 202 is in focus.

Here, the visual item 208 corresponds to a Payable/Receivable information portion having a Business Package generality level and belonging to the Business Adaptation Catalog category 116C. This is indicated by the item 208 being located at the level 112A and in the segment 110C, respectively. The square shape of the item 208 also indicates that its corresponding information portion is a member of the Business Adaptation Catalog category 116C.

The visual items 210A-C correspond to Due Payment, Trade Receivables Payable Register, and Dunning information portions, respectively. These information potions are all of a Business Object generality level, and as such their visual items 210A-C are located at the level 110C. These information portions are all members of the Enterprise Services Architecture category 116D, as indicated by the location of items 210A-C in the segment 110D and by the circular shape of the items 210A-C.

The Payables/Receivables information portion also has several associated information portions that are members of the User Interface category 116A, as represented by the folder visual item 206 and its location in the segment 110A as well as its diamond shape. These information portions are of a Work Center View generality level, as indicated by the item 206 being located at the level 112B and by the label next to the item 206. The numeral seven within the folder visual item 206 and its stack of multiple diamond shapes indicate that the item 206 represents multiple (here: seven) information portions.

In general, an information portion and a visual item used to represent it are selected for display based on space available within the area 108. This selection is in addition to the selection based on the information portion having an association with the item in focus. Particularly, the amount of detail included in a visual item (e.g., whether to show only its symbol or also its name, and additionally the name of its generality level) is determined by the space available in the area 108. In addition, visual items are placed in the area 108 so as to generally minimize overlap of the visual items.

Here, a rule has been used to determine that, for example, not enough space was available to present all of the individual information portions represented by the folder visual item 206, or that the other items 208 and 210A-C have a greater importance than the information portions represented by the folder visual item 206. Due to this determination, the folder visual item 206 is presented (in closed form) rather than displaying individual visual items corresponding to each information portion.

In some implementations, when information portions are determined to be less important or there is not enough space available to present the information portions, items representing the information portions may be allowed to overlap. The overlapping items may be partially transparent to allow a user to identify each of the overlapping items.

In some implementations, information portions may be selected for inclusion in the presentation based on a closeness criterion (e.g., a degree of separation between the focus item and its associated items). For example, a user may specify a closeness criterion of directly associated items (i.e., one degree of separation from the focus item), such as is the case for the items 206, 208, and 210A-C. In another example, also information portions associated with those information portions directly associated with the focus item may be presented as visual items (i.e., two degrees of separation from the focus item).

In some implementations, information portions may be selected for presentation based on a type criterion. For example, FIG. 1 shows information portions belonging to the Business Scenario category 116B that are associated with the Payables/Receivables information portion. Visual items corresponding to these Business Scenario information portions are not shown in FIG. 2. This occurs, for example, when a user specifies a type criterion indicating that items corresponding to information portions belonging to the Business Scenario category 116B are not relevant. Alternatively, the user may have specified a type criterion indicating that information portions having a generality level of Business Scenario Variant are not relevant.

Figure 3:
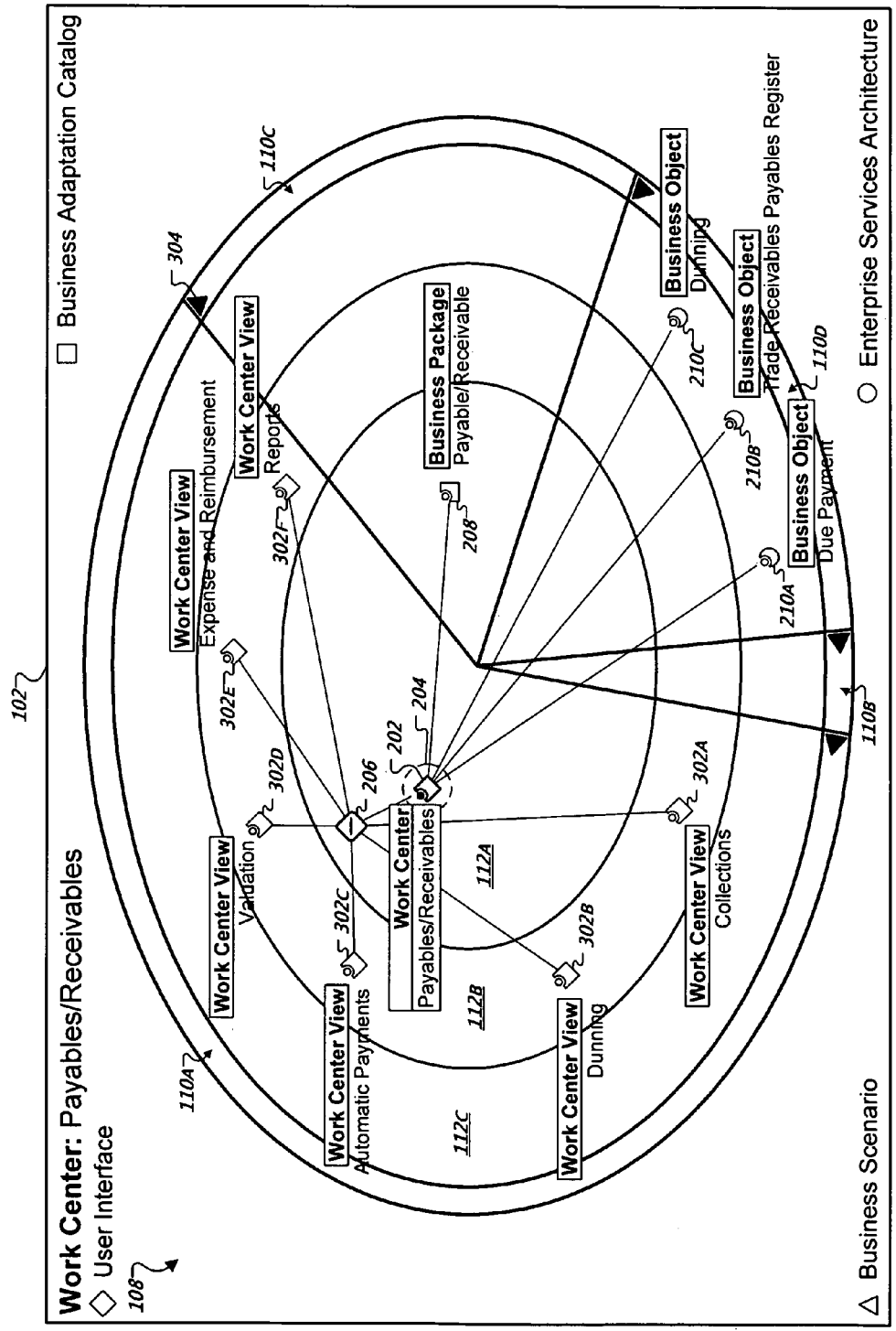
FIG. 3 is an example of a presentation area after expanding a folder visual item.

Visual items that represent several other items can be expanded to show more detail. FIG. 3 is an example of the presentation area 102 after the folder visual item 206 is expanded. As will be described, there are several different situations in which this expansion can occur. The area 108 now includes visual items 302A-F corresponding to information items named Collections, Dunning, Automatic Payments, Valuation, Expense and Reimbursement, and Reports, respectively. These information portions all belong to the User Interface category 116A as indicated by the location of the visual items 302A-F in the segment 110A and the diamond shapes of the visual items 302A-F. These information portions are also all of a Work Center View generality level as indicated by the location of the items 302A-F at the level 112B. The folder item 206 now includes a horizontal line indicating that it has been expanded or unfolded.

In one example, the expansion occurs upon a user selecting (e.g., "clicking on") the folder item 206 to initiate the unfolding of the items 302A-F. The unfolding of the items 302A-F includes determining a new location for each of the items 202, 206, 208 and 210A-C, and determining a location for the items 302A-F among the levels 112A-C. New sizes of the segments 110A-D are also determined. The locations and sizes are chosen to make room for the items 202, 206, 208, 210A-C, and 302A-F in the area 108. Here, this results in the segment 110A becoming larger and the other segments 110B-D becoming smaller. When a segment decreases in size, it is considered whether to fold several items located therein into a folder visual item. Similarly, when a segment becomes larger, it is considered whether to expand any folder item located therein.

Figure 4:
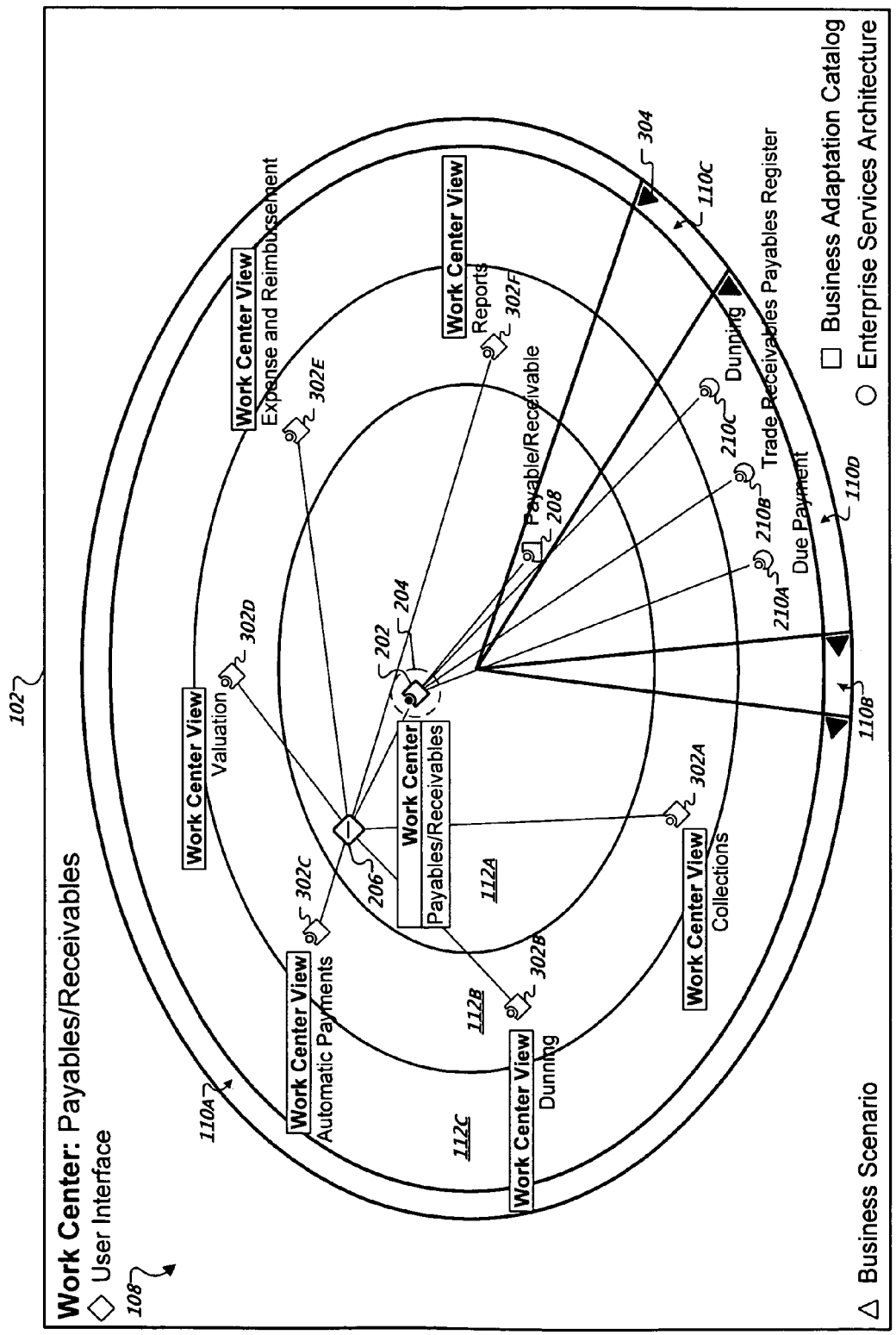
FIG. 4 is an example of a presentation area after resizing a segment.

In another example, the expansion occurs upon a user selecting a resizing control 304 to specify a new larger size for the segment 110A, such as by dragging the resizing control 304 from its previous location to its location shown in FIG. 3. The control 304 visually behaves as if the line from the center of the area 108 to its periphery, at which the control 304 is located, were hinged at the center of the area 108. That is, the control 304 traces the periphery of the area 108 upon being moved. The resizing of the segment 110A causes the individual items 302A-F to be unfolded from the folder item 206 and also triggers a reevaluation of the sizes of the remaining segments and of how the items 202, 206, 208, and 210A-C are currently placed. As a result, the size of at least one of the segments 110B-D changes to maintain the size of the area 108. Additionally, and any or all visual items located in the area 108 may be relocated, so that the space in the area is more efficiently used. FIG. 4 is an example of the presentation area 102 after resizing the segment 110A. Here, the resizing occurs upon the user dragging the resizing control 304 to make the segment 110A larger.

As a third example, the expansion shown in FIG. 3 occurs in response to the size of the segment 110A increasing upon another segment in the area 108 becoming smaller.

In addition, the area 108 may return to a state similar to FIG. 2, with the folder item 206 in the folded state, upon a user closing the folder item 206, or specifying a smaller size for the segment 110A using the resizing control 304, or upon the user enlarging another one of the segments.

The user can move one or more individual items within the area 108. For example, the user can drag the item 202 from its position shown in FIG. 3 to its position shown in FIG. 4. The items are associated with respective segments and categories through their corresponding information portions, but the area 108 allows the user to drag any of the visual items also into another segment with which it is not associated. This does not affect the underlying information portion and can help the user see the individual items more clearly.

When a segment becomes smaller or larger items within the segment may be diminished or enlarged, respectively. For example, the size of the segments 110B-D as shown in FIG. 3 decreases to that shown in FIG. 4 as a result of the segment 110A being increased in size. The size reduction of the segments 110C-D causes the items 208 and 210A-C to be diminished. In particular, the respective generality level names, Business Package and Business Object, are removed. Other diminishing examples may include, an item name being removed, text or symbols being reduced in size or length, items being folded together, an item being removed, or some combination of these or other examples. Conversely, when a segment is enlarged, an item name or other text may be added, a symbol may be added, text or symbols may be enlarged, a folder may be expanded, an item may be added, or some combination of these or other examples.

In some implementations, resizing of a segment may occur as a result of focus changing from a first item to a second item. For example, the focus 204 may change from the item 202 to the item 208, such as by a user selecting the item 208. The item 208 may have a set of associated items that is different than the item 202. This different set of items, each having its own particular category and generality level, may have different spatial needs than the items 206, 208, 210A-C, and 302A-F associated with the item 202. For example, the item 208 may have fewer associated User Interface items than the item 202 has. In this example, the size of the segment 110A may be reduced given the smaller number of items included there. In other words, the distribution of the segments within the area 108, and the respective sizes and locations of items therein, is adapted based on the items that are currently to be presented.

Figure 5:
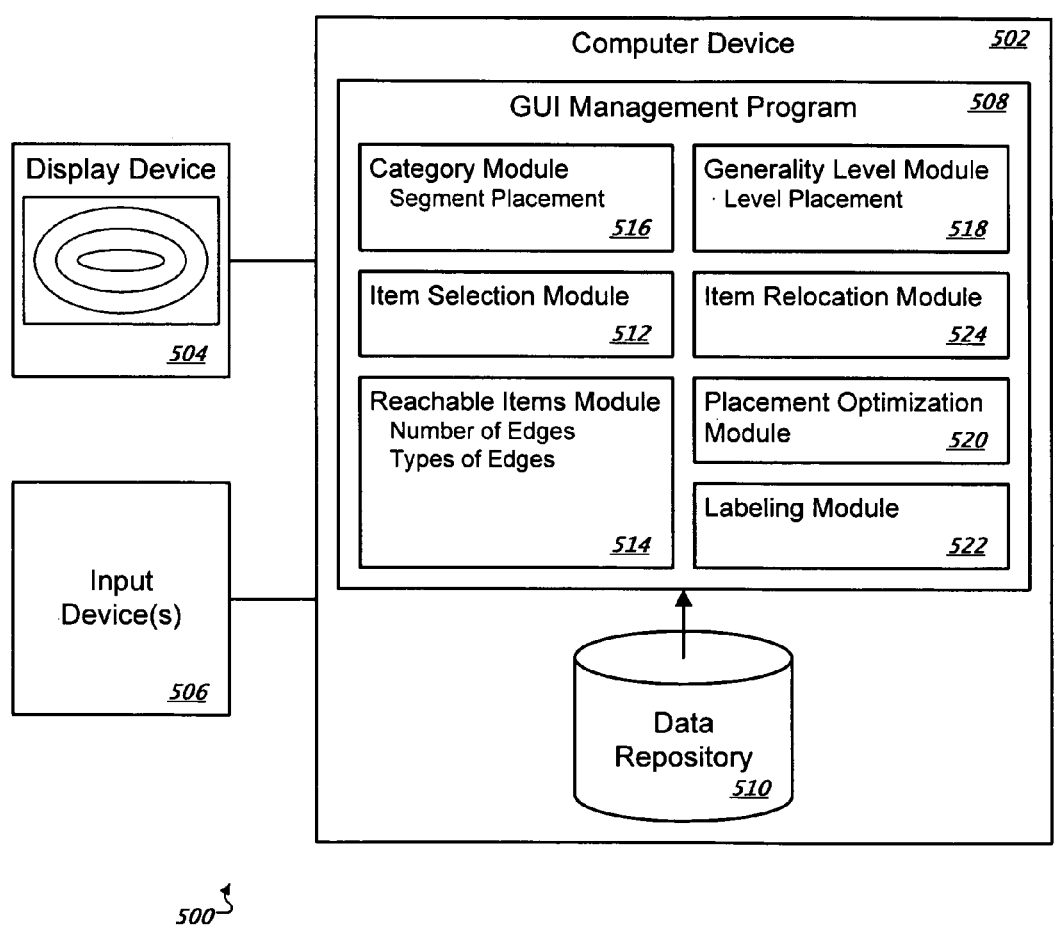
FIG. 5 is a block diagram of an example of a system for visually presenting information to a computer user.

FIG. 5 is a block diagram of an example of a system 500 for visually presenting information to a computer user. The system 500 includes a computer device 502, a display device 504, and one or more input devices 506. The system 500 may be connected to one or more other systems, for example in a computer network.

A GUI management program 508, included in the computer device 502, presents a GUI, such as the GUI 100, to a user via the display device 504. The GUI represents information stored in a data repository 510. For example, the repository may contain the information of the backend of an enterprise resource planning (ERP) system, such as those available from SAP AG in Walldorf (Baden), Germany. The user may make inputs to the GUI management program 508 via the one or more input devices 506 to affect the operation of the system 500 and particularly to control its presentation of information.

The GUI management program 508 includes an item selection module 512, a reachable items module 514, a category module 516, a generality level module 518, a placement optimization module 520, a labeling module 522, and an item relocation module 524. The item selection module 512 is configured to identify information that can be presented in the GUI. For example, the item selection module receives user's inputs made under guidance of the search area 104 and retrieves the corresponding information from the repository 510.

The reachable items module 514 determines which of the items selected by the module 512 are to be presented. This may be done based on associations with the item in focus, using a type criterion or a closeness criterion to name a few examples.

The category module 516 manages the association between the individual information portion and one of the predefined categories. Accordingly, it assigns each of the items that are to be presented to one of the segments based on the corresponding information portion's category, and assigns it to a level corresponding to its generality level.

The placement optimization module 520 places each of the items within its assigned segment and level so as to make efficient use of the available space. This involves determining the respective sizes of segments and determining whether a group of information portions will be represented individually or as a folder item.

The labeling module 522 determines the labeling of the items. Labeling may include, for example, a symbol, an item name, a generality level name, or some combination thereof. The labeling module 522 may determine a labeling method to be used for each item based on the amount of space available in a segment. Accordingly, the labeling module makes this determination in coordination with the optimization module 520.

The item relocation module 524 allows an item to be relocated. For example, a user may make an input using the one or more input devices 506, such as by selecting and dragging an item to a new location.

Figure 6:
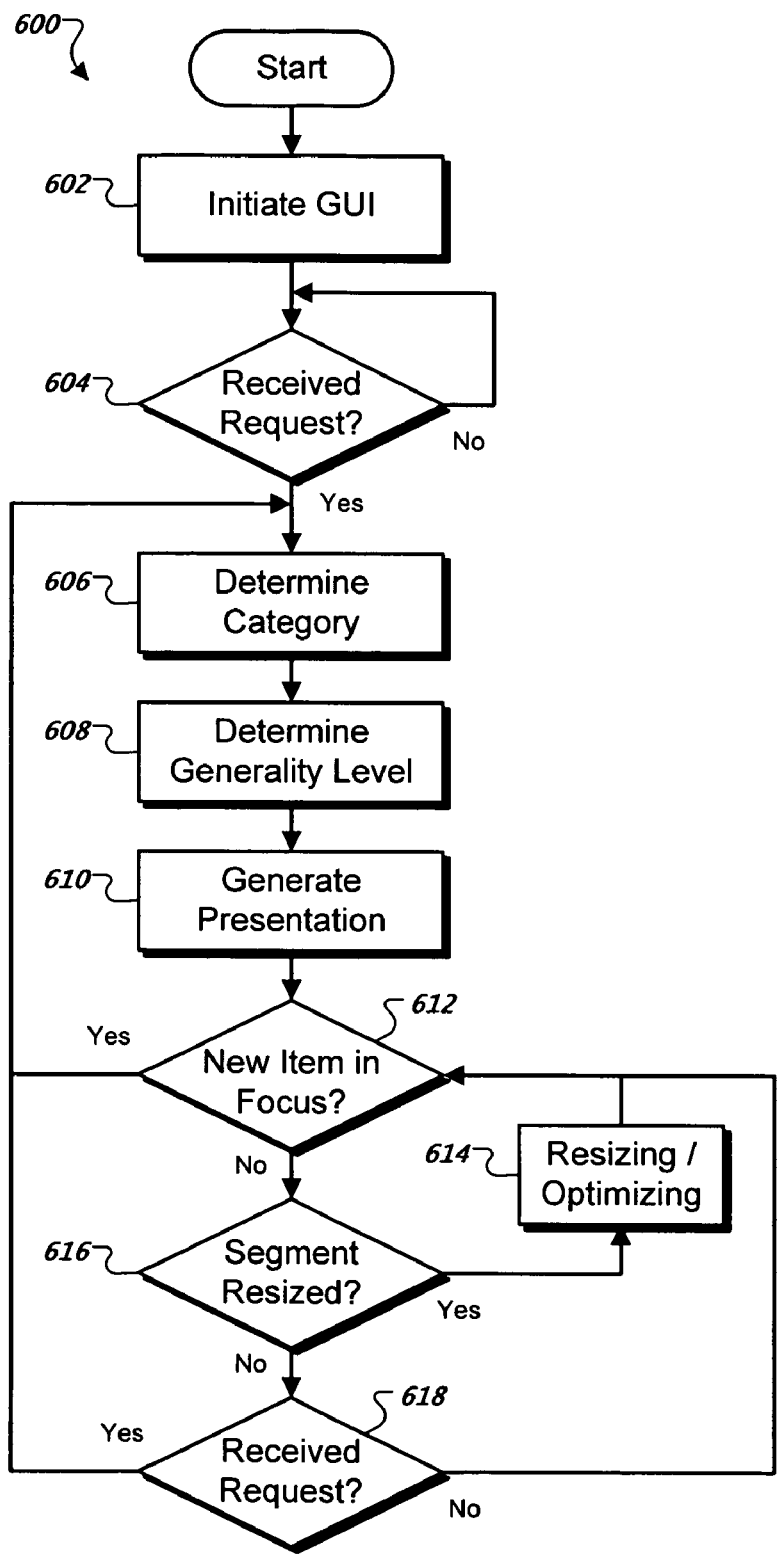
FIG. 6 is a flow chart of exemplary operations that may be performed to present information to a computer user.

FIG. 6 is a flow chart of an example of operations 600 for presenting information to a user. A processor executing instructions stored in a computer program product can perform the operations 600. For example, the operations 600 can be performed to generate the GUI 100 as it appears in any of FIGS. 1-4. The operations 600 begin at step 602 with an initiation of a GUI. For example, the GUI management program 508 may initiate the GUI 102.

At step 604, it is determined whether a request to present a first visual item is received. The first visual item represents a first information portion selected from an information collection available in the computer system. For example, the user may enter, using the area 104, a search for "Payables/Receivables" from the repository 510. This search corresponds to the user requesting that the sought item be presented. If no request is received the operations 600 return to step 604.

In contrast, if a request is received in step 604, the operations determine in step 606 which of several predefined categories the first information portion is associated with. For example, the item selection module 512 can perform a search based on the user's input and the reachable items module 514 can determine which of the resulting visual items are to be presented. In this example, the category module 516 can then determine which of the categories 116A-D those visual items are associated with.

In step 608 it is determined which of several predefined generality levels the first information portion has. For example, this determination can be done by the generality level module 518.

In step 610 there is generated a presentation on a display device. The presentation includes an area divided into segments extending between a center and a periphery of the area. The segments correspond to the respective predefined categories, and the area is concentrically divided into levels corresponding to the respective predefined generality levels. The first visual item is placed in one of the segments and at one of the levels according to its determined category and generality level. For example, the GUI 100 can be generated to include the area 108 in which visual items are placed accordingly among the segments 110A-D and at the levels 112A-C. In this example, the placement of the items is determined by the placement optimization module 520, based on available space, and the labeling of the items by the labeling module 522, based on available space.

In step 612 it is determined whether a new item is in focus. If so, then the operations 600 return to step 606 for category determination to be performed for the new item, and for any item(s) associated therewith. For example, the focus changes upon a user selecting a new item within the presentation area 102 or the search area 104.

If the focus has not changed in step 612, the operations continue with step 616, in which it is determined whether a segment is resized. If so, the operations proceed to step 614 where the presentation is resized and optimized. For example, the placement optimization module 520 may again perform actions to position the items, size the other segments, or fold/unfold groups of items. In addition, the labeling module 522 may again determine labeling for the items based on space available in the segments. The operations 600 proceed from step 614 back to step 612 where a check is made for a new item in focus.

If at step 616, no segment is resized, then the operations 600 proceed to step 618 where it is determined whether a request to present a visual item is received. This occurs, for example, upon the user initiating a new search using the area 104. If a request is received at step 618, then the operations 600 return to step 606 for category determination to be performed for the new item, and for any item(s) associated therewith. If no request is received, then the operations 600 return to step 612 where a check is made for a new item in focus.

Figure 7:
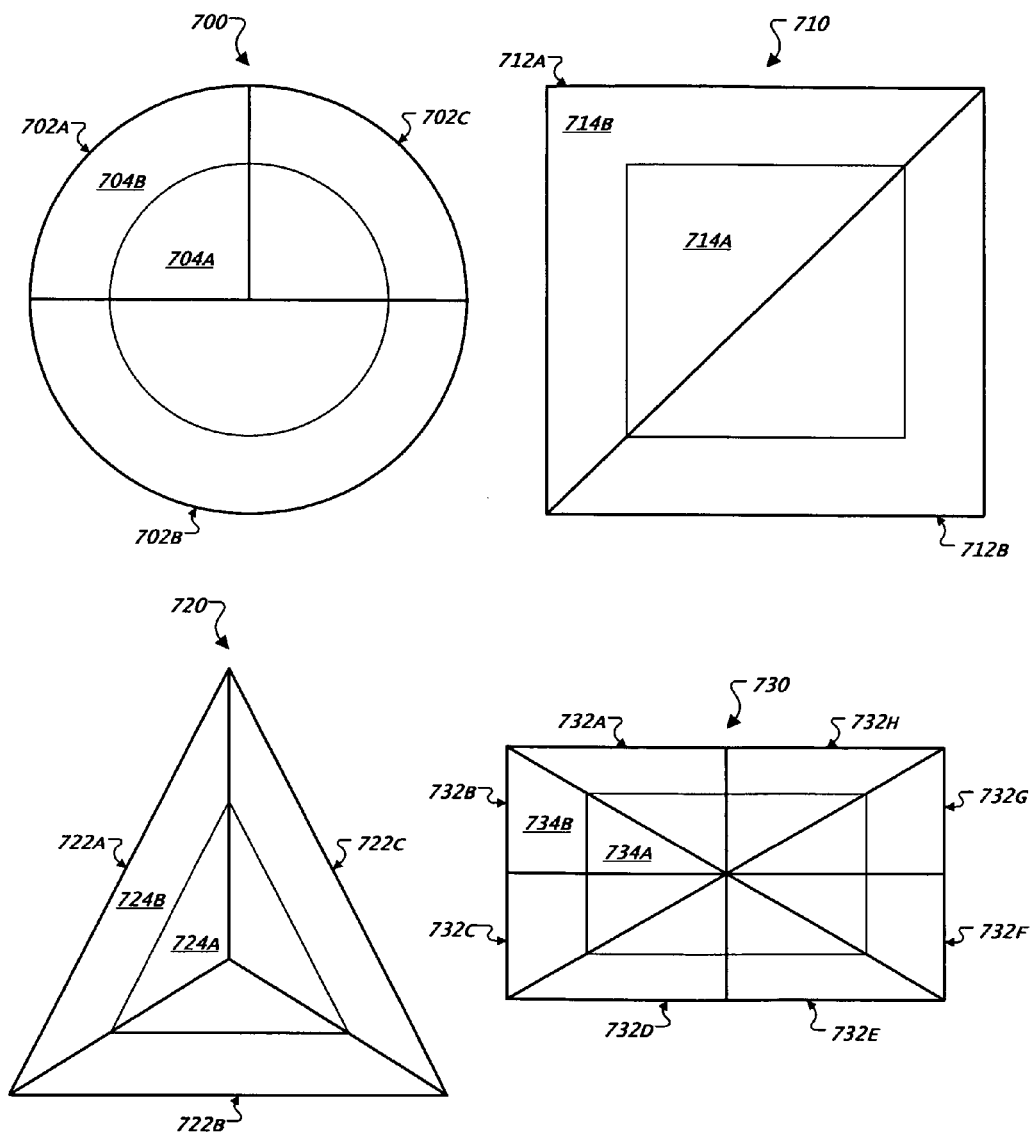
FIG. 7 includes examples of area shapes that may be used to present information to a computer user.

Many different shapes, segments and level configurations may be used for the area 108. FIG. 7 shows other examples of shapes 700, 710, 720, and 730 that may be provided to the area 108. Shape 700 is a circle divided into three segments 702A-C extending between a center of the circle and a periphery thereof. The circle is concentrically divided into two levels 704A-B. Similarly, the shape 710 is a square divided into two segments 712A-B and concentrically divided into two levels 714A-B, the shape 720 is a triangle divided into three segments 722A-C and concentrically divided into two levels 724A-B, and the shape 730 is a rectangle divided into eight segments 732A-H and concentrically divided into two levels 734A-B. Any of the exemplary shapes 700, 710, 720 and 730 can be provided with a different configuration of segments, or levels, or both. For example, any of the angular shapes 710, 720 and 730 may have a segment whose boundary does not coincide with one of its angles.

In some implementations, the shape used may be predefined or the choice of a shape may be based on a user preference. In some implementations, the choice of shape may be based on the shape of an available presentation area, such as the shape of the presentation area 102. In some implementations, the choice of shape may be based on the information being presented. For example, the number of sides on the shape may correspond to the number of segments presented.

Figure 8:
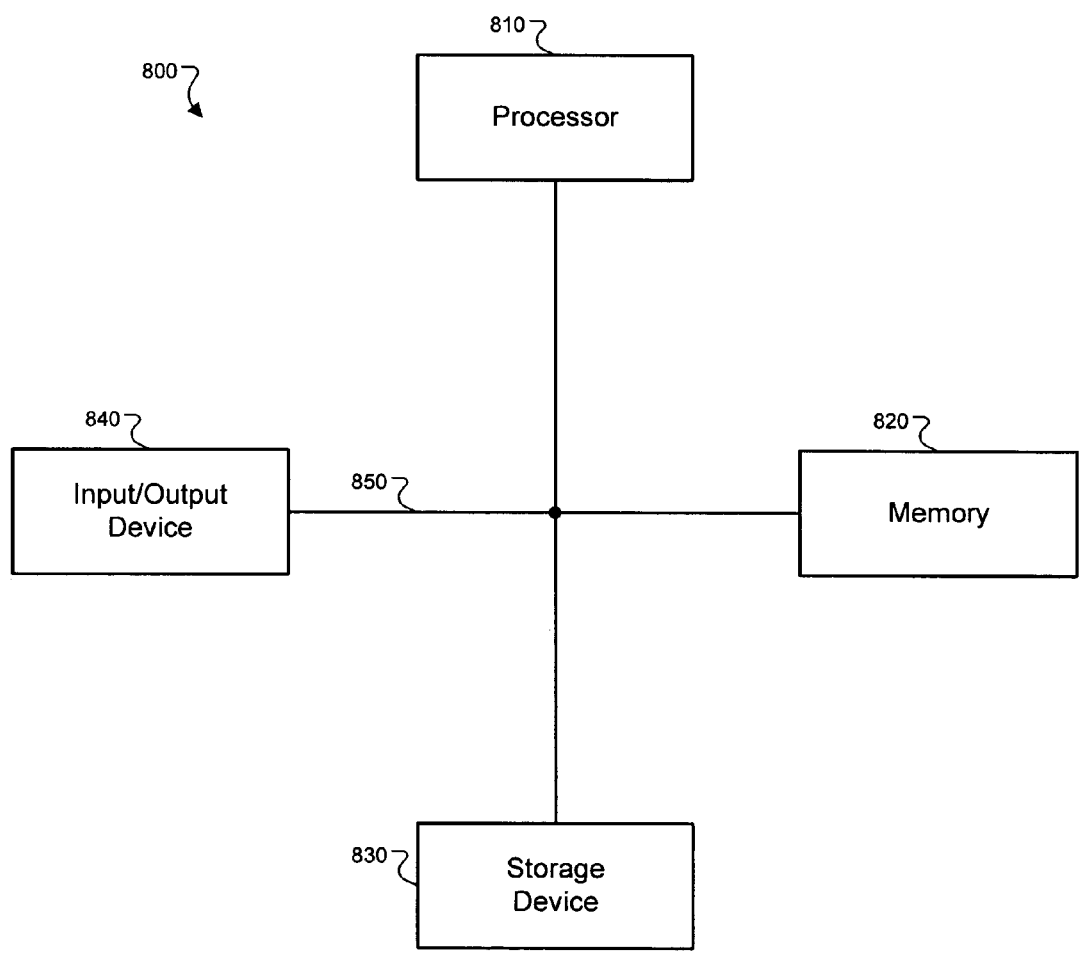
FIG. 8 is a block diagram of an example of a generic computer system.

FIG. 8 is a block diagram of a computer system 800 that can be used in the operations described above, according to one embodiment. For example, the system 800 may be included in the system 500.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one embodiment, the processor 810 is a single-threaded processor. In another embodiment, the processor 810 is a multi-threaded processor. The processor 810 is capable of processing instructions stored in the memory 820 or on the storage device 830 to display graphical information for a user interface on the input/output device 840.

The memory 820 stores information within the system 800. In one embodiment, the memory 820 is a computer-readable medium. In one embodiment, the memory 820 is a volatile memory unit. In another embodiment, the memory 820 is a non-volatile memory unit.

The storage device 830 is capable of providing mass storage for the system 800. In one embodiment, the storage device 830 is a computer-readable medium. In various different embodiments, the storage device 830 may be a floppy disk device, a hard disk device, an optical disk device, or a tape device.

The input/output device 840 provides input/output operations for the system 800. In one embodiment, the input/output device 840 includes a keyboard and/or pointing device. In one embodiment, the input/output device 840 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of visually presenting information to a computer user, the method comprising:

receiving, in a computer system, a request to present a first visual item representing a first information portion selected from an information collection available in the computer system;

determining, in response to the request: (i) which of several predefined categories the first information portion is associated with, and (ii) which of several predefined generality levels the first information portion has;

generating, on a display device, a presentation that includes an area divided into segments extending between a center and a periphery of the area, the segments corresponding to the respective predefined categories, the area being concentrically divided into levels corresponding to the respective predefined generality levels, wherein the first visual item is placed in a first one of the segments and at one of the levels according to its determined category and generality level; and resizing the first segment and correspondingly resizing a remainder of the segments to maintain a size of the area, wherein the first visual item comprises a folder for at least one other visual item, and wherein the resizing of the first segment occurs upon a user unfolding the first visual item to show also the at least one other visual item, or upon the user folding the first visual item to cease showing the at least one other visual item.

2. The method of claim 1, wherein the first information portion is associated with a second information portion in the information collection, further comprising:

determining, in response to the request: (iii) which of the several predefined categories the second information portion is associated with, and (iv) which of the several predefined generality levels the second information portion has; and placing a second visual item corresponding to the second information portion in one of the segments and at one of the levels according to its determined category and generality level, wherein the first visual item has a focus and the second visual item does not have the focus.

3. The method of claim 2, further comprising:

receiving a user input to change the focus from the first visual item to the second visual item;

determining, in response to the user input, (a) at least a third information portion in the information collection that is associated with the second information portion, (b) which of the several predefined categories the third information portion is associated with, and (c) which of the several predefined generality levels the third information portion has; and placing a third visual item corresponding to the third information portion in one of the segments and at one of the levels according to its determined category and generality level, wherein the second visual item has the focus and the third visual item does not have the focus.

4. The method of claim 2, wherein the first information portion is associated with several information portions in the information collection, and wherein the second information portion is selected from the several information portions based on a closeness criterion.

5. The method of claim 2, wherein the first information portion is associated with several information portions in the information collection, and wherein the second information portion is selected from the several information portions based on a type criterion.

6. The method of claim 1, wherein another resizing of the first segment occurs upon a user moving a boundary of the first segment under guidance of the presentation.

7. The method of claim 1, wherein the first visual item has a focus and a second visual item in the area does not have the focus, and wherein another resizing of the first segment occurs upon receiving a user input to change the focus from the first visual item to the second visual item.

8. The method of claim 1, further comprising determining, upon the resizing: (a) for any of the segments that become smaller, whether to diminish any visual items located there; and (b) for any of the segments that become larger, whether to enlarge any visual items located there.

9. The method of claim 1, further comprising selecting information to be presented together with the first visual item in the presentation, the selection being made based on space available for the first visual item in the area.

10. The method of claim 9, further comprising placing the selected information in the area so as to minimize overlap.

11. The method of claim 9, further comprising presenting the selected information such that the selected information is partially transparent.

12. The method of claim 1, further comprising relocating the first visual item in the area upon a user moving the first visual item under guidance of the presentation.

13. The method of claim 1, further comprising presenting an additional area on the display device displaying additional information for the first visual item, and making a change in the area or to the first visual item upon a user selecting an input control in the additional area.

14. A computer program product tangibly embodied in a computer-readable storage medium, the computer program product including instructions that, when executed, cause a processor to perform operations comprising:

receiving, in a computer system, a request to present a first visual item representing a first information portion selected from an information collection available in the computer system;

determining, in response to the request: (i) which of several predefined categories the first information portion is associated with, and (ii) which of several predefined generality levels the first information portion has;

generating, on a display device, a presentation that includes an area divided into segments extending between a center and a periphery of the area, the segments corresponding to the respective predefined categories, the area being concentrically divided into levels corresponding to the respective predefined generality levels, wherein the first visual item is placed in a first one of the segments and at one of the levels according to its determined category and generality level; and resizing the first segment and correspondingly resizing a remainder of the segments to maintain a size of the area, wherein the first visual item comprises a folder for at least one other visual item, and wherein the resizing of the first segment occurs upon a user unfolding the first visual item to show also the at least one other visual item, or upon the user folding the first visual item to cease showing the at least one other visual item.

15. A computer program product tangibly embodied in a computer-readable storage medium, the computer program product including instructions that, when executed, generate on a display device a graphical user interface for visually presenting information to a user, the graphical user interface comprising:

an area divided into segments extending between a center and a periphery of the area, the segments corresponding to respective predefined categories, the area being concentrically divided into levels corresponding to respective predefined generality levels, wherein the graphical user interface is configured to place a first visual item corresponding to a first information portion in a first one of the segments according to one of the predefined categories associated with the first information portion, and at one of the levels according to one of the predefined generality levels that the first information portion has, and resizing the first segment correspondingly resizes a remainder of the segments to maintain a size of the area, wherein the first visual item comprises a folder for at least one other visual item, and wherein the resizing of the first segment occurs upon a user unfolding the first visual item to show also the at least one other visual item, or upon the user folding the first visual item to cease showing the at least one other visual item.

16. The computer program product of claim 15, wherein the graphical user interface is configured for: (i) automatically resizing the segments while maintaining a size of the area, (ii) presenting a second visual item in the area while a focus is on the first visual item, wherein a user can change the focus from the first visual item to the second visual item, and (iii) automatically adjusting an amount of detail presented in each of the segments based on available space.

17. The computer program product of claim 15, wherein the graphical user interface further comprises an additional area displaying additional information for the first visual item, wherein the graphical user interface is configured for making a change in the area or to the first visual item upon a user selecting an input control in the additional area.

18. The computer program product of claim 15, wherein the area has a shape selected from the group consisting of an ellipse, a circle, a square, a triangle, a rectangle, and combinations thereof.

* * * * *

UNITED STATES PATENT AND TRADEMARK OFFICE
CERTIFICATE OF CORRECTION

| | | |
|---|---|---|
| PATENT NO. | : 7,594,191 B2 | Page 1 of 1 |
| APPLICATION NO. | : 11/392442 | |
| DATED | : September 22, 2009 | |
| INVENTOR(S) | : Leidig et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Twenty-eighth Day of September, 2010

David J. Kappos
*Director of the United States Patent and Trademark Office*